United States Patent
Heidari-Bateni et al.

(10) Patent No.: US 7,769,362 B2
(45) Date of Patent: Aug. 3, 2010

(54) SYSTEM AND METHOD FOR POWER MANAGEMENT

(75) Inventors: Ghobad Heidari-Bateni, San Diego, CA (US); Alaa Muqattash, San Diego, CA (US)

(73) Assignee: Olympus Corporation, Hachioji-Shi, Tokyo (JP)

( * ) Notice: Subject to any disclaimer, the term of this patent is extended or adjusted under 35 U.S.C. 154(b) by 668 days.

(21) Appl. No.: 11/767,342

(22) Filed: Jun. 22, 2007

(65) Prior Publication Data

US 2007/0295259 A1    Dec. 27, 2007

Related U.S. Application Data

(60) Provisional application No. 60/816,282, filed on Jun. 23, 2006.

(51) Int. Cl.
*H04B 1/38* (2006.01)
*H04B 1/16* (2006.01)

(52) U.S. Cl. .................. 455/343.4; 455/343.1; 455/574

(58) Field of Classification Search .............. 455/343.1, 455/127.1, 127.5, 572, 574, 343.2, 343.4, 455/343.5; 370/311, 338
See application file for complete search history.

(56) References Cited

U.S. PATENT DOCUMENTS

| | | | |
|---|---|---|---|
| 5,560,021 A | | 9/1996 | Vook et al. |
| 6,564,074 B2 * | | 5/2003 | Romans ..................... 455/574 |
| 6,665,520 B2 * | | 12/2003 | Romans ..................... 455/13.4 |
| 6,879,567 B2 * | | 4/2005 | Callaway et al. ............ 370/311 |
| 6,907,227 B2 * | | 6/2005 | Fujioka ..................... 455/41.3 |
| 6,963,747 B1 | | 11/2005 | Elliot |
| 7,400,595 B2 * | | 7/2008 | Callaway et al. ............ 370/311 |
| 7,526,253 B2 * | | 4/2009 | Fujioka ..................... 455/41.3 |
| 7,564,826 B2 * | | 7/2009 | Sherman et al. ............. 370/338 |
| 7,672,263 B2 * | | 3/2010 | Sinivaara .................... 370/318 |
| 2003/0002482 A1 | | 1/2003 | Kubler et al. |
| 2003/0199272 A1 | | 10/2003 | Shvodian et al. |
| 2004/0190467 A1 | | 9/2004 | Liu et al. |
| 2004/0253996 A1 | | 12/2004 | Chen et al. |
| 2005/0117530 A1 | | 6/2005 | Abraham et al. |
| 2005/0195772 A1 | | 9/2005 | Nishikawa |
| 2005/0227615 A1 | | 10/2005 | Sakoda |
| 2005/0249137 A1 | | 11/2005 | Todd et al. |
| 2005/0275587 A1 | | 12/2005 | Siegel et al. |
| 2006/0128351 A1 | | 6/2006 | Hassan et al. |

FOREIGN PATENT DOCUMENTS

| EP | 0522631 | 1/1993 |
|---|---|---|
| EP | 0529269 | 3/1993 |
| EP | 1033832 | 9/2000 |
| EP | 1519599 | 3/2005 |
| EP | 1592272 | 11/2005 |
| EP | 1608192 | 12/2005 |
| GB | 2415573 | 12/2005 |
| WO | 2005076545 | 8/2005 |
| WO | 2005094103 | 10/2005 |

* cited by examiner

*Primary Examiner*—Sonny Trinh
(74) *Attorney, Agent, or Firm*—Sheppard Mullin Richter & Hampton LLP

(57) ABSTRACT

The present invention provides a method for managing power of devices on a network. The method comprises: transmitting a first weighted value and a first anchor status of a first device on the network to a second device on the network, wherein the second device is a neighboring device to the first device; receiving a second weighted value and a second anchor status from the second device; and setting one of the devices as an anchor device based on one or more of weighted values and the anchor statuses, wherein the anchor device is configured to either wake up at predetermined times or to remain active.

24 Claims, 15 Drawing Sheets

SYSTEM AND METHOD FOR POWER MANAGEMENT

CROSS-REFERENCE TO RELATED APPLICATIONS

This application claims the benefit of U.S. Provisional Application No. 60/816,282 filed Jun. 23, 2006, which is incorporated herein by reference in its entirety.

FIELD OF THE INVENTION

The present invention relates generally to systems and methods for power management, and more particularly, some embodiments relate to a method for managing power of a network device.

BACKGROUND OF THE INVENTION

It can be advantageous in the design of electronic devices, portable or otherwise, to implement techniques to reduce power consumption. With reduced power consumption, advantages can be obtained such as prolonged battery life (where batteries are used), reduced thermal generation, and less real-estate required for power supplies. Portable electronic devices such as cellular telephones, PDAs, laptop computers, wireless network devices and so on, can benefit from techniques for reducing power consumption.

One effective method to reducing power consumption is to enable devices to go into a sleep or hibernation mode when not in use. In such modes, devices may turn off entirely, or turn off or cut back certain functions, until the device is called upon for activity. Thus, terms such as hibernation, power-save mode, sleep mode, or inactive, are used somewhat interchangeably herein to refer to complete or partial shutdown of devices and their components.

Timers, user input, communications, or other events may trigger full or partial awakening from a sleep mode. For example, with hand-held devices that have human interfaces, the pushing of a button or other user action might be sufficient to waken the device from a power-save state. However, where a device might be called upon for action without human interaction, such as for example, a communication device, techniques other than user input are useful for wakening the device.

BRIEF SUMMARY OF EMBODIMENTS OF THE INVENTION

According to various embodiments of the invention, systems and methods for managing power of network devices are provided. In accordance with one embodiment of the invention, a method for managing power of a plurality of devices on a network comprises: transmitting a first weighted value and a first anchor status of a first device on the network to a second device on the network, wherein the second device is a neighboring device to the first device; receiving a second weighted value and a second anchor status from the second device; and assigning an anchor status to one of the devices based on one or more of weighted values and the anchor statuses. The anchor device is configured to either wake up at predetermined times or to remain active. Further, the anchor is configured to go into a partial hibernation when it is not in active mode.

In an embodiment, each weighted value comprises a number of cycles a respective device has not been an anchor. In yet another embodiment, each weighted value is based on one or more of a device characteristics such as the device function, type, power characteristics, location in the network, importance ranking, and communication partners. The method further includes the steps of assigning either the first or second device as a dedicated anchor device for the network based on the first and second weighted values.

In a further embodiment, the method assigns an anchor status that includes the steps of: selecting the first device as the anchor device if only the first anchor status is positive; selecting the second device as the anchor device for the first device if only the second anchor status is positive; selecting the first or second device as the anchor device based on the weighted value of each respective device if both the first and second anchor statuses are the same; and selecting the first or second device as the anchor device based on a beacon slot value of each respective device if both the first and second weighted values are the same.

In yet another embodiment, the anchor device serves as the anchor for itself and for the first or second device.

In a further embodiment, the method includes the step of receiving a third weighted value and a third anchor status from a third device on the network.

In yet another embodiment, the method assigns an anchor status using the steps of: a) receiving a weighted value and an anchor status from all neighboring devices; b) selecting one of the devices to be a non-anchor device if all of its neighboring devices have weighted values higher than its own weighted value or if none of its neighboring devices have lower weighted values and all of the neighboring devices with equal weighted values have beacon slot values higher than a beacon slot value of the device; c) selecting one of the devices as the anchor device if all of its neighboring devices have lower weighted values or if none of its neighboring devices have higher weighted values and all of the neighboring devices with weighted values equal to its own weighted value have beacon slot values lower than a beacon slot value of the device; d) setting one of the devices as undecided status if no device is selected in steps b and c; and e) sending a status update of the device to a neighboring device. Further, the method chooses a neighboring device of a non-anchor device with the undecided status and with a highest weighted value as the anchor device.

In a further embodiment of the present invention, a system comprises: a first device on the network configured to transmit a first weighted value and a first anchor status to a neighboring device; and a second device on the network configured to transmit a second weighted value and a second anchor status to the first device, wherein the second device is the neighboring device to the first device; and wherein the first and second device are configured to select one of the devices as an anchor device based on one or more of weighted values and the anchor statuses, wherein the anchor device is configured to either wake up at predetermined times or to remain active.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
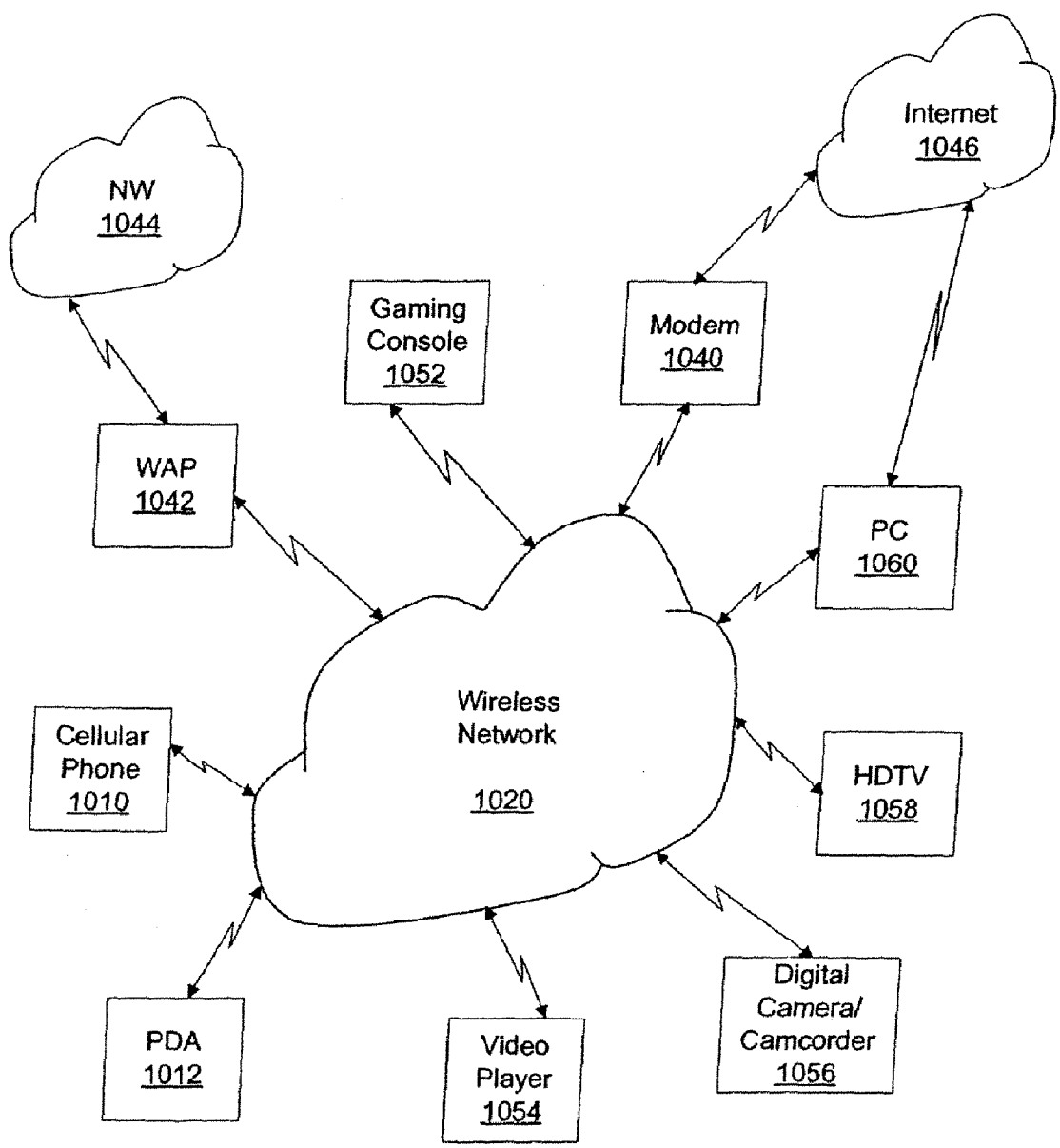
FIG. 1 is a diagram illustrating an exemplary environment in which the present invention can be implemented.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Before describing the invention in detail, it is useful to describe an example environment in which the invention can be implemented. One such example is a wireless beaconing network in which multiple electronic devices (for example, computers and computing devices, cellular telephones, personal digital assistants, motion and still cameras, among others) can communicate and share data, content and other information with one another. One example of such a network is that specified by the WiMedia standard (within WiMedia and Multi-Band OFDM Alliance). From time-to-time, the present invention is described herein in terms of a distributed network or in terms of the WiMedia standard. Description in terms of these environments is provided to allow the various features and embodiments of the invention to be portrayed in the context of an exemplary application. After reading this description, it will become apparent to one of ordinary skill in the art how the invention can be implemented in different and alternative environments. Indeed, applicability of the invention is not limited to a distributed wireless network, nor is it limited to the MB-UWB standard described as one implementation of the example environment.

Most network standards specify policies or rules that govern the behavior of network connected devices. The WiMedia standard specifies the mechanism and policies that are to be followed by W-USB and WiNet compliant devices in order to allow for an ad hoc and distributed network of such devices to operate efficiently. Policies, requirements, protocols, rules, guidelines or other factors used to incentivize, recommend, specify, govern, control or manage the behavior of devices operating in a communication network are generally referred to herein as utilization policies.

In most distributed networks, the network of the devices is maintained by requiring all devices to announce parameters such as their presence, their capabilities and their intentions for reserving transmission slots and so on. For example, with the WiMedia standard, this can be done during what are referred to as beacon period time slots. According to this standard, devices joining the network are expected to monitor the beacon period to learn about the network status and parameters before attempting to use the network. In other network configurations, beacon periods are similarly used to allow management of network devices as described more fully below. Thus, beacon periods are one form of window or network period during which scheduling or other housekeeping activities can be conducted. Beacon periods in the above-referenced standard, and other time periods used for scheduling or other housekeeping chores in other network configurations, are generally referred to as scheduling windows.

Devices are typically allowed to enter a power save mode to conserve power and possibly prolong operation. For example, battery-operated and other devices may enter a sleep mode or even a deep-sleep mode, wherein one or more of their functions are diminished or shut down in order to conserve power. Depending on the environment, devices may be allowed to enter into a sleep mode for short or long periods of time. For example, a sleep mode can be an energy-saving mode of operation in which some or all components are shut down or their operation is limited. Many battery-operated devices, such as notebook computers, cell phones, and other portable electronic devices support one or more levels of a sleep mode. For example, when a notebook computer goes into one level of sleep mode, it may turn off the hard drive and still allow the user to perform operations, only powering up the hard drive when access is needed. In a deeper level of sleep, the computer may further turn off the display. In yet a further level of sleep, the computer may enter a hibernate state. Likewise, other electronic devices communicating across a communication channel may have similar sleep states and may power down unnecessary or unused components, including an RF transceiver, depending on a number of factors such as elapsed time, activities and so on. As described below, in accordance with one embodiment, devices may be prompted to enter a sleep mode upon completion of scheduling or other housekeeping activities and be configured to awaken for scheduled activities such as, for example, communication activities.

FIG. 1, attached, is a block diagram illustrating one possible configuration of a wireless network that can serve as an example environment in which the present invention can be implemented. Referring now to FIG. 1, a wireless network 1020 is provided to allow a plurality of electronic devices to communicate with one another without the need for wires or cables between the devices. A wireless network 1020 can vary in coverage area depending on a number of factors or parameters including, for example, the transmit power levels and receive sensitivities of the various electronic devices associated with the network. Examples of wireless networks can include the various IEEE and other standards as described above, as well as other wireless network implementations.

With many applications, the wireless network 1020 operates in a relatively confined area, such as, for example, a home or an office. The example illustrated in FIG. 1 is an example of an implementation such as that which may be found in a home or small office environment. Of course wireless communication networks and communication networks in general are found in many environments outside the home and office as well. In the example illustrated in FIG. 1, wireless network 1020 includes a communication device to allow it to communicate with external networks. More particularly, in the illustrated example, wireless network 1020 includes a modem 1040 to provide connectivity to an external network such as the Internet 1046, and a wireless access point 1042 that can provide external connectivity to another network 1044.

Also illustrated in the example wireless network 1020 are portable electronic devices such as a cellular telephone 1010 and a personal digital assistant (PDA) 1012. Like the other electronic devices illustrated in FIG. 1, cellular telephone 1010 and PDA 1012 can communicate with wireless network 1020 via the appropriate wireless interface. Additionally, these devices may be configured to further communicate with an external network. For example, cellular telephone 1010 is typically configured to communicate with a wide area wireless network by way of a base station.

Additionally, the example environment illustrated in FIG. 1 also includes examples of home entertainment devices connected to wireless network 1020. In the illustrated example, electronic devices such as a gaming console 1052, a video player 1054, a digital camera/camcorder 1056, and a high definition television 1058 are illustrated as being interconnected via wireless network 1020. For example, a digital camera or camcorder 1056 can be utilized by a user to capture one or more still picture or motion video images. The captured images can be stored in a local memory or storage device associated with digital camera or camcorder 1056 and ultimately communicated to another electronic device via wireless network 1020. For example, the user may wish to provide a digital video stream to a high definition television set 1058 associated with wireless network 1020. As another example, the user may wish to upload one or more images from digital camera 1056 to his or her personal computer 1060 or to the Internet 1046. This can be accomplished by wireless network 1020. Of course, wireless network 1020 can be utilized to provide data, content, and other information sharing on a peer-to-peer or other basis, as the provided examples serve to illustrate.

Also illustrated is a personal computer 1060 or other computing device connected to wireless network 1020 via a wireless air interface. As depicted in the illustrated example, personal computer 1060 can also provide connectivity to an external network such as the Internet 1046.

In the illustrated example, wireless network 1020 is implemented so as to provide wireless connectivity to the various electronic devices associated therewith. Wireless network 1020 allows these devices to share data, content, and other information with one another across wireless network 1020. Typically, in such an environment, the electronic devices would have the appropriate transmitter, receiver, or transceiver to allow communication via the air interface with other devices associated with wireless network 1020. These electronic devices may conform to one or more appropriate wireless standards and, in fact, multiple standards may be in play within a given neighborhood. Electronic devices associated with the network typically also have control logic configured to manage communications across the network and to manage the operational functionality of the electronic device. Such control logic can be implemented using hardware, software, or a combination thereof. For example, one or more processors, ASICs, PLAs, and other logic devices or components can be included with the device to implement the desired features and functionality. Additionally, memory or other data and information storage capacity can be included to facilitate operation of the device and communication across the network. Software can include program code that is executable by a processing device to perform the desired functions.

Electronic devices operating as a part of wireless network 1020 are sometimes referred to herein as network devices, members or member devices of the network or devices associated with the network. In one embodiment devices that communicate with a given network may be members or merely in communication with the network.

Some communication networks are divided into periods or frames that can be used for communication and other activities. For example, as discussed above, some networks have a scheduling window such as, for example, a beacon period, for scheduling upcoming communication activities. Also, some networks have a communication window during which such communication activities take place. In the WiMedia-MBOA standard, the bandwidth is divided into superframes, which in turn are divided into time slots for the transmission and reception of data by the various electronic devices associated with the network.

Figure 2:
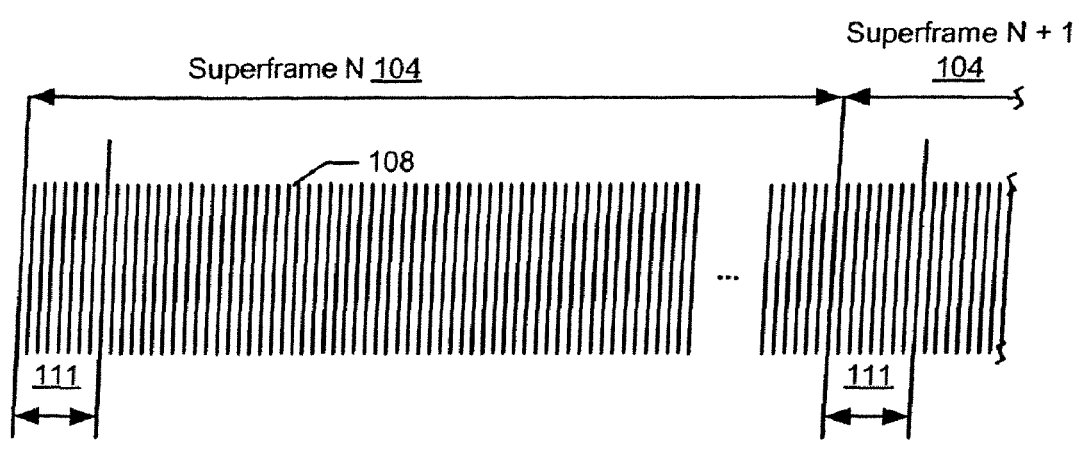
FIG. 2 is a diagram illustrating an exemplary data timeslot having a plurality of superframes.

An example of such time slots are illustrated in FIG. 2, attached. Referring now to FIG. 2, in this exemplary environment, the communication bandwidth is divided into superframes 104 (two illustrated), each superframe 104 itself being divided into a plurality of timeslots referred to as Media Access Slots 108. In the example environment, there are 256 media access slots 108 in each superframe 104, although other allocations are possible. Additionally, at the beginning of each superframe 104 is a beacon period 111, which is comprised of a plurality of beaconing slots. In some networks, the beacon period 111 is a period during which devices reserve timeslots and exchange other housekeeping or status information.

For example, in the WiMedia-MBOA distributed wireless network, the superframes comprise a beacon period 111, during which devices are awake and receive beacons from other devices. Superframes in the above-referenced standard, and other time periods used for communications among devices in other network configurations, with or without scheduling windows, are generally referred to herein as communication windows.

As noted above, for clarity of description the present invention is described in terms of the example environment, and thus is at times described using the terms superframe and beacon period. As would be apparent to one of ordinary skill in the art after reading this description, the invention applies to other communication formats, and other electronic devices, including the more general case utilizing scheduling windows and communication windows. Additionally, the invention is not limited to applications where the bandwidth is divided into frames or windows, but can be generally applied to communication channels and networks of various protocols and configurations.

Network devices can take on various configurations and architectures and, as the above examples illustrate, can perform a variety of functions, from printers, to web cameras, to modems, to servers, and so on. Network devices typically have some form of control logic that is configured to manage communications across the network and to manage the operational functionality of the network device. Such control logic can be implemented using hardware, software, or a combination thereof. For example, one or more processors, ASICs, PLAs, and other logic devices or components can be included with the device to implement the desired features and functionality. Additionally, memory or other data and information storage capacity can be included to facilitate operation of the device and communication across the network.

Example embodiments of the invention are now described in terms of the above-described example environment. In one implementation, consider a situation in which all network devices go into a hibernation mode, or wherein all devices on a part of a network go into a hibernation mode. In such a situation, the network can potentially suffer from drawbacks. For example, the first device waking up and transitioning from hibernation to an active mode typically scans the network for at least an entire superframe 104 as described by the WiMedia MAC specifications. This scanning could conceivably result in more energy consumption than beaconing throughout the hibernation period. This is because reception power is typically higher than transmission power in some devices (such as, for example, in a WiMedia radio), and the reception duration (e.g., at least one superframe 104) can be much longer than the transmission duration of ten or even hundreds of beacon periods 111.

As another example, if all network devices choose to go into the active mode at the same exact time, then it may happen that every device is creating its own beacon period 111 start time. This can result in significant protocol overhead to try to merge different beacon groups.

In accordance with one embodiment of the invention, a mechanism can be provided to facilitate electing certain network devices to either wake up at predetermined times or to remain active. These devices are referred to herein as anchors. In one embodiment, the anchors are used to avoid the above mentioned problems. In one embodiment, these identified devices can be configured to stay active and not go into hibernation. In another embodiment, the anchors can be configured to go into a partial hibernation or power save mode, thereby ensuring that their functionality useful for coordinating network activities is available as other devices awaken from hibernation. Although the term 'anchor' is used to describe these designated devices, the term is chosen for convenience only and not as a limiting term!. Any designation, descriptive or otherwise, can be chosen for devices that perform in some or all of the described features or that remain totally or partially awake for such purposes.

In one embodiment, a sufficient quantity of devices can be defined as anchors so that every device, or a quantity of devices, is either in the radio range of at least one anchor or that device itself is an anchor. Several mechanisms can be used for assigning one or more network devices to the anchor role. For example, in one embodiment certain devices could be dedicated anchor devices for the network. Selection of such devices can be made, for example, based on various device characteristics such as device function or device type, device power characteristics, device location in the network, device importance, a device's communication partners (i.e., with which other devices does a given device communicate or share information with) and so on. As a few examples, anchor devices may be selected as those devices with: more robust power sources; a greater likelihood of a need to be awake anyway for network activities; a location in proximity with other network devices so as to minimize or reduce the total quantity of anchor devices needed, and so on. Of course, combinations of these characteristics can also be used, weighted or unweighted in various fashions, to select or identify anchor devices.

In another embodiment, one or more schemes can be implemented to rotate the anchor role to share the anchor responsibilities (for example, the power consumption burden) among all the network devices or among a subset of network devices. Various schemes can be implemented based on device characteristics as discussed above to share the anchor responsibilities in a manner that makes sense for the network environment.

As these examples serve to illustrate, schemes can be implemented that consider features such as: ensuring that there are enough anchors so that every device is in the radio range of at least one anchor; rotating the anchor role to ensure that all devices share the burdens of anchorship; reducing or minimizing the number of anchors in a network; and use only local information in a decentralized manner.

As the above discussion illustrates, there are numerous schemes that can be implemented to distribute anchor responsibilities among network devices. A few of these schemes are now described.

According to one embodiment of the invention a hibernation anchor data protocol can be defined for communicating anchor information among devices. This can be used to facilitate the anchor selection process among devices. For example, one anchor protocol can be designated as follows:

| | |
|---|---|
| 1 Byte | 1 Byte |
| Element ID = 1E#1 | Weight = # of cycles since last anchorship |
| 1 Byte | 2 Byte |
| Element ID = IE#2 | Anchor's DevAddr |

The example schemes are described from time to time herein in terms of this example anchor protocol. After reading this description, it will become apparent to one of ordinary skill in the art how alternative protocols can be implemented. As such, the schemes described should not be limited thereby.

In a first example scheme, each cycle can be identified as a given number, Y, of superframes 104. For example, in one embodiment, Y=256 superframes 104, although other configurations are possible. Cycle start time can be designated to be the same as Active Cycle Start Time (ACST) as defined by the WiMedia specification, and the anchors devices for the current cycle can be selected during the previous cycle using the methodologies outlined below.

Step 1: In a first step, every device (or devices designated as a participant device for anchor rotation) advertises its weight. In embodiments using the above-described protocol, this can be done in information element (IE) # 1 in its beacons 111. For example, this can be done starting from the first superframe of every cycle until it selects its anchor. After that, with the anchor selected, the device can include an anchor designation in its beacons. For example, this can be done in IE#2 (in the example protocol) in every beacon until the end of the current cycle.

In one embodiment, the device weight is the number of cycles the device has not been an anchor. Preferably, this is the number of contiguous cycles it has not been an anchor since the last time it was an anchor. However, in alternative embodiments, cumulative totals can be maintained and announced for given time periods or windows rather than simply accumulating a quantity of cycles since it was last an anchor. Additionally, alternative characteristics or various combinations of characteristics can be combined to create a weight for a device.

Step 2: In the second step, every device, or at least the devices elected to participate in the process, selects an anchor according to a set of rules. One example of rules that can be used for this process are described below. In one embodiment, a device's selection is preferably made only after that device has heard all its neighbors' weights and all its neighbors with smaller beacon slot numbers have announced their anchors.

As stated above, one example of selection rules is provided. According to this example, when it is a device's turn to make a decision, the following rules are applied:

If a device observes its identifier in a received protocol, the device shall assume itself to be an anchor for the next cycle and advertise its own identifier to the other devices. For example, using the protocol outlined above, this device can identify itself as an anchor using Element ID IE#2. In one embodiment, the identifier used can be a device's EUI-48™, which is the IEEE defined 48-bit extended unique identifier. In another embodiment, the identifier can be a device address such as, for example, the DevAddr specified by the WiMEdia specification.

If, however, the device observes an identification of one of its neighbors as an anchor, then in this example, the device shall choose that neighbor as the anchor and advertise that neighbor's identifier to the other devices (e.g., in IE#2).

If none of the above conditions occur, in this example, the device can select the device with the highest weighting to be the anchor among itself and its neighbors. This can be accomplished in a number of different ways. In one embodiment:

i. If all weights are equal, the device chooses itself to be an anchor for the next anchor cycle and announces that to the other devices (for example, advertises its identification in IE#2).

ii. If two or more devices have the same highest weight, then the device shall choose the neighbor with the highest beacon slot number to be the anchor and announces that to the other devices (for example, advertises the chosen device's identifier in IE#2).

Note that in one embodiment, the device may request one or more of its neighbors to send their weighting (for example, via IE#1 using a Probe IE#1). So it may take more than one superframe to obtain all neighbors' weighting. This can solve problems associated with lost beacons.

In a second example scheme, weighting based on one or more characteristics can be a deterministic factor in anchor assignments. An example process for this is now described. As above, cycles can be defined as Y superframes (e.g., Y=256). Cycle start time can be the same as ACST. Anchors for the current cycle are selected during the previous cycle using the steps described below.

Step 1: Every device advertises its weight in its beacons 111. For example, with the above protocol, this can be in IE#1.

Step 2: Once all neighbors' weights have been received, a device decides its Status to be an anchor, a non-anchor, or undecided by applying the rules such as the example rules shown below. This decision is then advertised (for example, in IE#2).

In the example rules for deciding, in one embodiment, the device can designate itself to be a non-anchor if at least one of the following is true:

All of its neighbors have higher weights than its own weight

None of its neighbors have a lower weight, and all neighbors with weights equal to the device weight have beacon slots numbers higher than the device own beacon slot number The device designates itself as an anchor if at least one of the following is true:

All of its neighbors have lower weights

None of its neighbors have a higher weight, and all neighbors with weights equal to the device weight have beacon slots numbers lower than the device own beacon slot number The device is undecided in all other cases.

Step 3: Once all neighbors' anchor status information (e.g., IE#2) have been received, a non-anchor sends an updated status (e.g., IE#3) that includes one of the anchors they observed in the received IE#2 (or other protocol). If no such anchor is observed, the non-anchor shall choose the undecided neighbor with the maximum weigh to be the anchor. If two or more undecided neighbors have the same weight, then the device with the highest beacon slot number is chosen.

Step 4: After receiving an updated status (e.g., IE#3) from all non-anchor neighbors:

An undecided device that receives its own identifier (e.g., its EUI-48 in any received IE#3) shall change its status to anchor and send an Updated Status (e.g., in IE#3) declaring itself to be an anchor An undecided device that does not receive its identifier (e.g., its EUI-48 in any received IE#3) but that has a neighboring anchor shall include the identification of one of the anchors it observed in an updated status (e.g., in IE#3).

An undecided device that does not receive its identifier (e.g., its EUI-48 in any received IE#3) shall include the all zeros (e.g., in IE#3)

Note: In an error-free channel, the above steps can take only 4 superframes 104.

Step 5: After receiving IE#3 from all non-anchors and undecided devices if an undecided device sees an anchor, then it changes its status to a non-anchor. Else, it chooses itself to be an anchor and sends that selection (e.g., in IE#4).

A third example scheme is now described. As above, cycles can be defined as Y superframes (e.g., Y=256). Cycle start times can be, for example, the same as the Active Cycle Start Time (ACST) as defined by the WiMedia specification. Anchors for the current cycle are selected at the beginning of the current cycle. For example, they are selected during the first few superframes 104. In this example, each device includes its weight in its beacons starting from the first superframe 104 of every cycle until it selects its anchor. After that, the device includes an identification if its anchor in every beacon until the end of the current cycle. The steps to select an anchor are as follows:

Step 1: each device includes its weight (e.g., IE#1) in its beacons starting from the first superframe of every cycle until it selects its anchor.

Step 2:

If a neighbor of a device announces itself to be an anchor (for example, discloses its identification in IE#2), the device shall select either that neighbor or itself to be the device's anchor and shall announce the selected anchor's device address or other identifier in subsequent beacons (for example, advertises that in IE#2). In one embodiment, the rules can be implemented to consider device characteristics in making this decision. For example, the device can be configured to select its neighboring anchor if the device itself is power-sensitive, and so on. As discussed herein, characteristics can be used in generating a weighting for a device.

Otherwise, if the device determines that none of its neighbors has announced itself as an anchor, then that device shall choose itself to be an anchor and shall send its own device address or other identifier in subsequent beacons (for example, advertises that in IE#2). In one embodiment the device makes its selection only after few conditions are satisfied. For example, after the device hears from each of its neighbors either the neighbors' IE#1 or IE#2, and after all neighbors with higher weights have announced their anchors (sent their IE#2), where beacon slot number is used as a tie breaker and devices with higher beacon slot numbers decide first.

In one embodiment, a device may select itself to be an anchor (e.g., send IE#2 with its own identifier) at any time (even as early as superframe 0).

Note that the order in which devices select anchors can be inherent in the protocol. As the above examples illustrate, protocols can be implemented to cause a higher-weight device to be an anchor before a lower-weight one. Also illustrated by these examples is that in some embodiments devices can remain active only until the negotiation is over, then a device can transition to the power save mode if it is not an anchor. For devices, the negotiation is over after all its neighbors have sent their designation (e.g., IE#2). This duration can be variable and depends on factors such as network topology. In the above examples, devices with more neighbors stay active for smaller portion of time.

In another embodiment, devices can be put into a class or classes for the negotiation process. For example, there may be one or more super classes of devices that are never anchors, or that are anchors only in certain circumstances or under certain conditions. In one embodiment, class information can be included in the weighting process and considering alone or in combination with other characteristics in determining the final weighting. In another embodiment, class information may be tracked separately and used to trump the weighting, or to trump certain weight thresholds. For example, mission-critical, power-sensitive devices may be assigned to a class that trumps all weights, or trumps weights that don't meet a certain threshold. As these examples illustrate, class structures and hierarchies of various configurations can be used alone or in combination with other characteristics to aid in anchor selection.

Finally, note that this protocol is immune to beacons' loss. To select itself to be an anchor, a device needs to hear either IE#1 or IE#2 of every neighbor. Neighbors are constantly advertising either IE#1 (before they select an anchor) or IE#2.

In the above example protocols, it can be noted that all negotiations are carried out through exchanging information in beacon periods 111. Particularly, the examples further illustrate an embodiment using information elements (IEs) included in beacons. However, in another embodiment, negotiation is carried out by the same or like protocols using negotiations within the superframe by broadcasting control frames. The advantage of this approach is that it can significantly speed up the negotiation process. For example, two devices can exchange their IE#1 and IE#2 for SHAP in one superframe 104 and so finish the negotiation in only 1 superframe.

The above example schemes differ somewhat in: complexity, the amount of time it takes to finish the negotiation, the number of chosen anchors, and immunity to beacon loss. Table 1, as shown below, illustrates a comparison between the three schemes. It can be seen that example three, results in a good compromise between performance and negotiation time.

TABLE 1

Number of superframes used by protocols in an error-free channel for the above-described example schemes/protocols.

| SCHEME: | EXAMPLE | | |
| --- | --- | --- | --- |
| | FIRST | SECOND | THIRD |
| Complexity | Moderate | High | Simple |
| Negotiation Time | Long & variable | Short: 4 superframes or less. | Short & Variable (order of few to several superframes) |
| Number of anchors | Moderate - low | Maybe be high | Lowest |
| Immunity to beacon loss | Moderate | Beacons losses have a significant negative effect on its performance | Beacons losses have no affect on its performance |

Table 2, as shown below, illustrates few examples of how the protocols might be implemented. Table 2 shows the number of superframes used by the protocols assuming an error-free channel and devices of equal weight. The number in the brackets refers to the beacon slot number of the device. Devices have equal weight in this table.

TABLE 2

| EXAMPLE SCHEME: | FIRST | SECOND | THIRD |
| --- | --- | --- | --- |
| Scenario | | | |
| A(2)-B(3) 4 devices in range | One anchor in in 1 superframe One anchor in in 40 superframe | One anchor in 1 superframes One anchor in 3 superframes | One anchor in 1 superframe One anchor in 3 superframe |
| A(2)-B(3)-D(4)-C(5) | B and C in 1 Next: A and D And so on | C and B in 4 superframes Next round: A and B in 3 superframes | C and B in 5 superframes Next: A and D in 3 superframes |
| A(5)-B(2)-C(4) \\ \| / D(3) \| E(6) | B and E in 4 superframes Next: A, C, and D in 4 superframes | Anchors: A, C, E in 4 superframes Next round: D in 3 Next: B and E in 3 And so on. | A, E, and C in 3 superframes Next: D in 3 superframes Next: B and E in 3 superframes |
| A(2)-B(3)-C(4)-D(5)-E(6)-F(7)-G(8)-H(9)-I(10)-J(11) | B, E, H and J in 11 superframes | Anchors: B, D, E, F, G, H and J in 4 superframes | B, D, F, H, and J in 11 superframes |

A few examples scenarios are now provided in FIGS. 3-7 to better illustrate example implementations of the invention. In these examples, consider various network devices A, B . . . X. The diagrams accompanying these drawings use the designation x,yyy,z, where x is the beacon slot number, yyy is the weight, and z is the Ancohor's identifier. For example, a designation of 2,255,0 means: the device is using beacon slot number 2; it has a Weight=255; and it's Anchor's EUI=0 (undefined). Likewise, a designation of 3,0,E means that the device is using beacon slot number 3, its weight is 0 and it has designated device E as its anchor. Also, in the accompanying figures, where a device, X, has announced itself to be an anchor, that device is designated as X'. Likewise, where a device, X, announces another device to be its anchor, that device is designated as X" in the drawings.

Figure 3A:
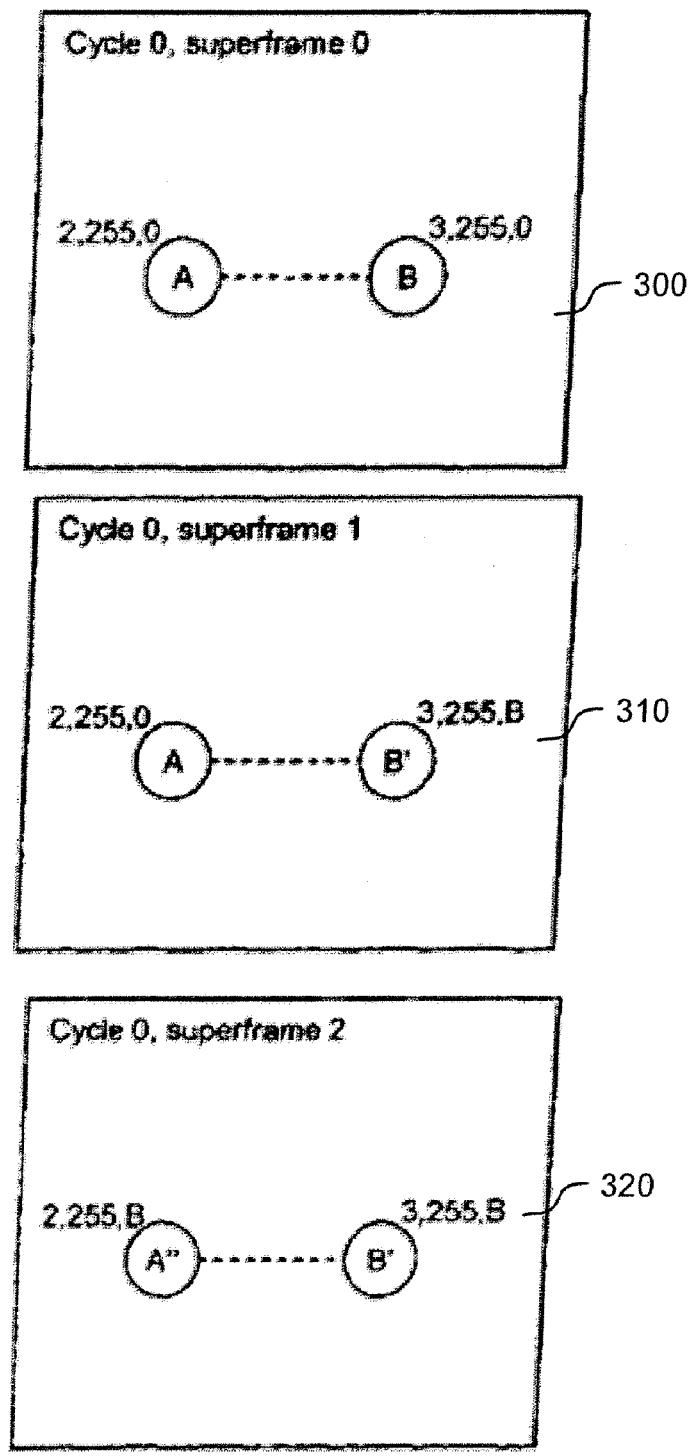
FIGS. 3A-C, 4A-C, 5A-C, 6A-C, and 7 illustrate exemplary network devices on various network configurations in which the present invention can be implemented.
Figure 3B:
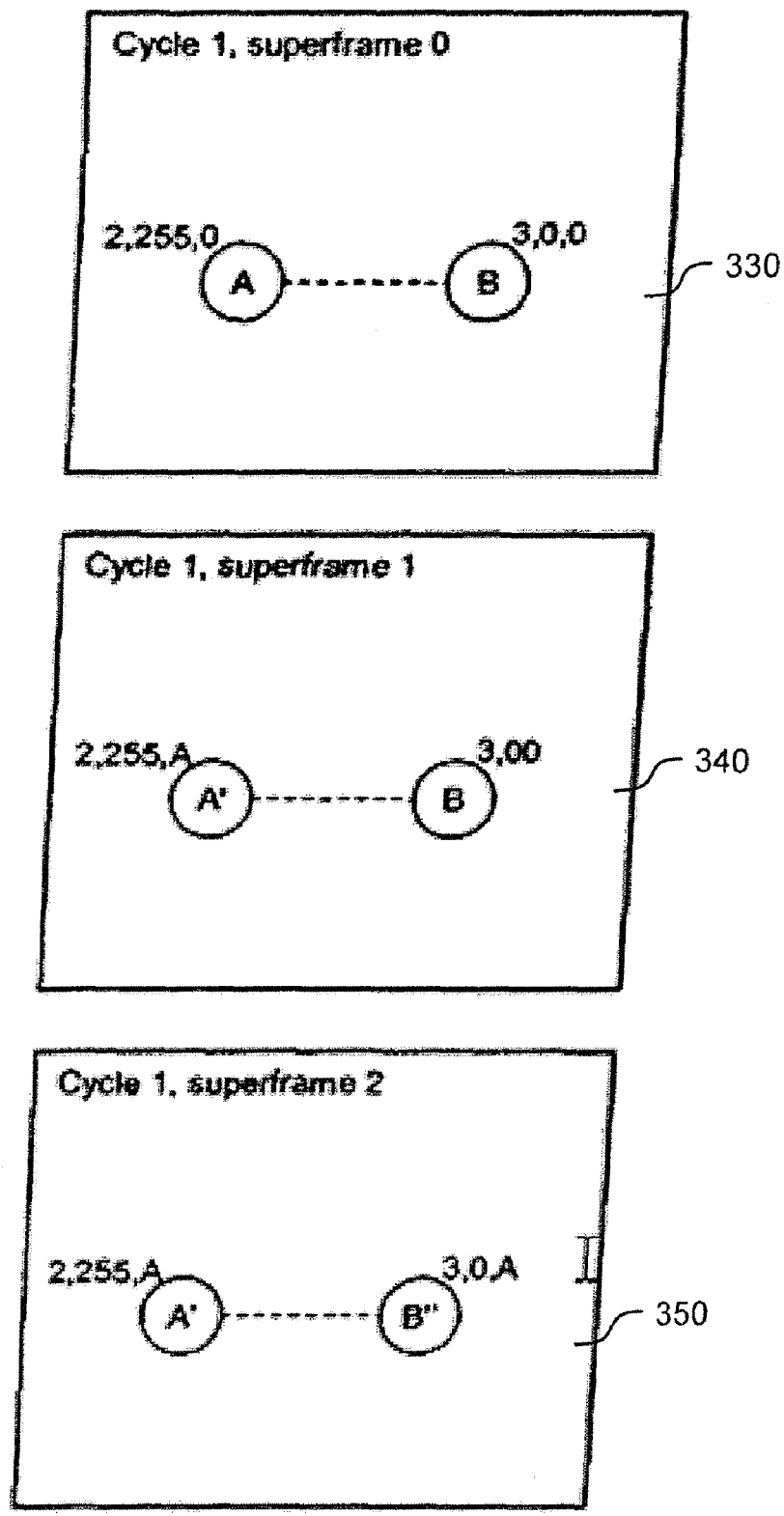
Figure 3C:
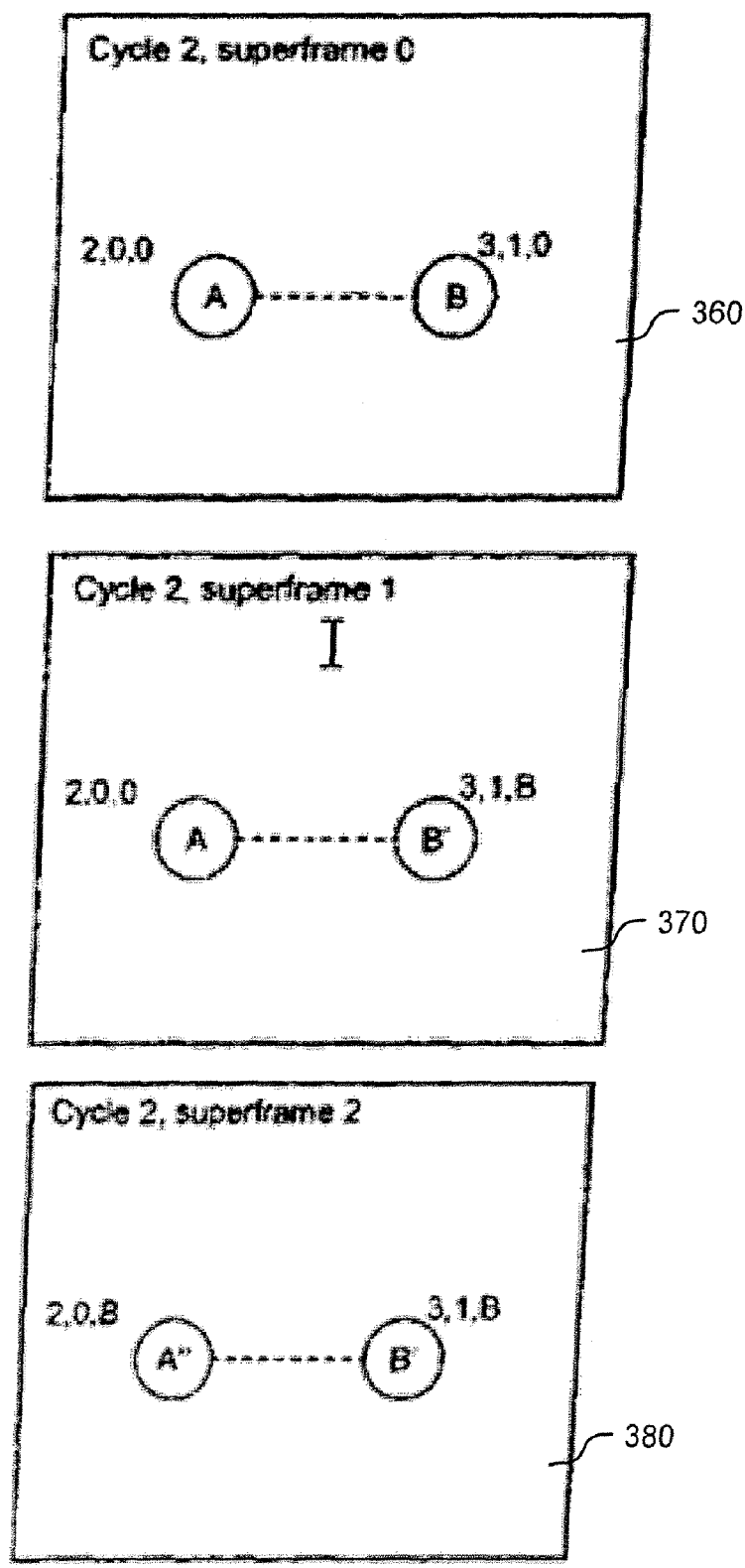

FIGS. 3A-3C illustrates the first example, devices A and B have just turned on and aligned themselves. For example, in one embodiment, they have aligned their Beacon Period Start Time (BPST) and their ACST. Assume that these two devices use beacon slot numbers 2 and 3, respectively.

Referring now to FIG. 3A, in superframe 0, block 300, device A uses beacon slot 2, device B uses beacon slot 3, both devices have equal eighting (255), and neither device has a designated anchor.

In block 310, superframe 1, device B has designated itself as the anchor device. (In keeping with the drawing conventions, B is illustrated as B'.)

In block 320, superframe 2, device A now announces that device B is it's anchor. (In keeping with the adopted drawing conventions, A is illustrated as A", having designated another anchor.)

Now, in this example, in the next cycle, Cycle I as illustrated in FIG. 3B, the initial weighting can be changed. This may occur because of a change in or update to device characteristics, for example. For instance, because B was the anchor in the immediately preceding cycle, its weight can be reduced. As such, in this example, B's weighting goes to 0 for superframe 0, as shown in block 330. Thus, in block 340, superframe I, A announces itself as the anchor and in superframe 2, block 350, B announces that A is its anchor.

Referring now to FIG. 3C, the start of cycle two in block 360, the weighting is again changed based on the characteristics of the devices. In this case, A is weighted at '0' and B at '1'. Again, this weighting can be based on a plurality of characteristics and various combinations thereof. In this example, A goes to '0' as it was the anchor in the immediately preceding cycle. B's weighting in this example is incremented to '1' as it has been one full cycle since it has been an anchor.

Thus in block 370, superframe 1, B announces itself again as the anchor based on its weighting relative to A. In block 380, superframe 2, and A confirms and announces B as its anchor. As discussed above, the devices can wait to hear each of their neighbor's weights and announcements prior to making a designation. For example, in superframe 0, B and A exchanged information regarding their respective weights. Based on this information, in superframe 1, B, realizing it had a higher weight (and also realizing that A did not announce itself as an anchor), announced itself as an anchor.

Figure 4A:
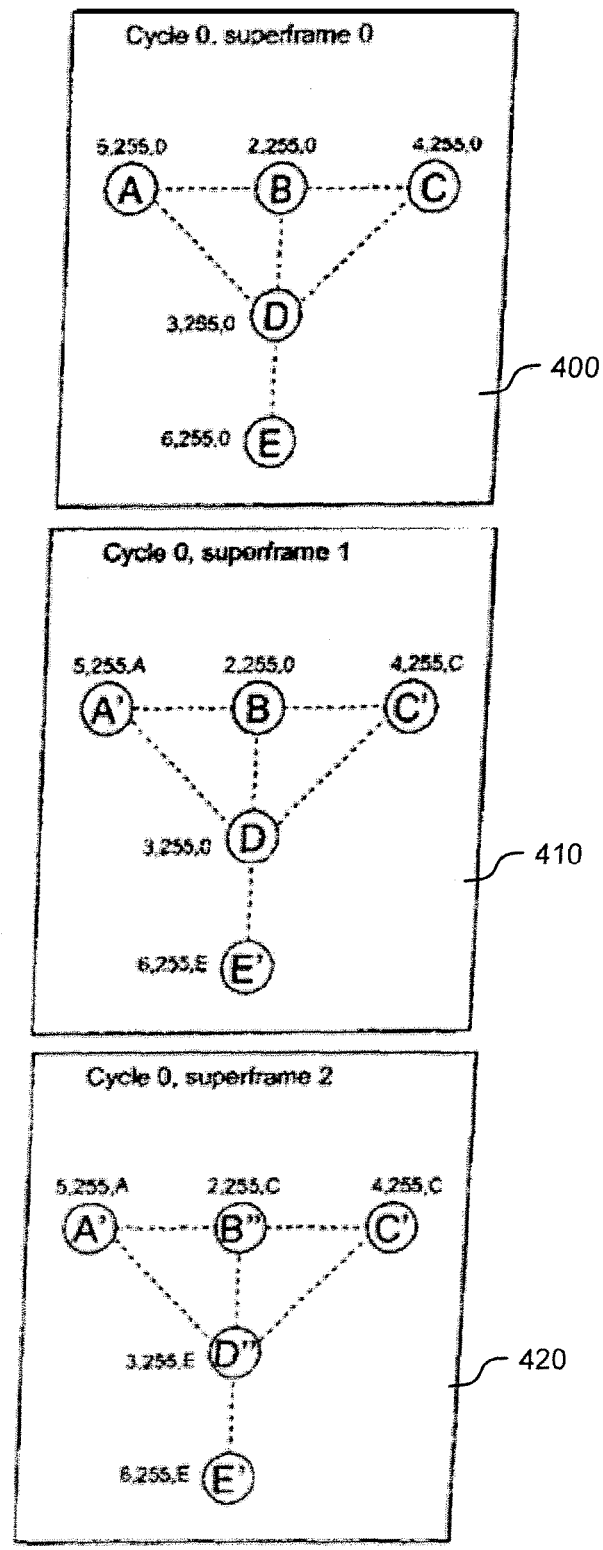
Figure 4B:
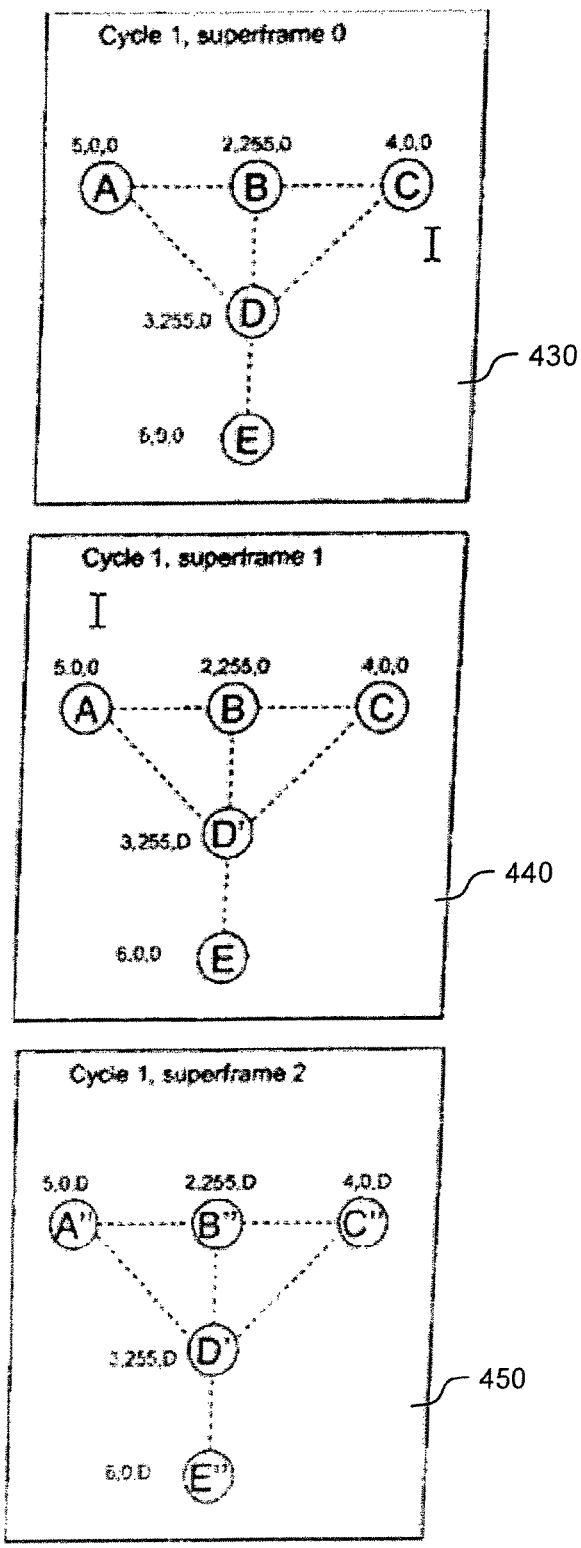
Figure 4C:
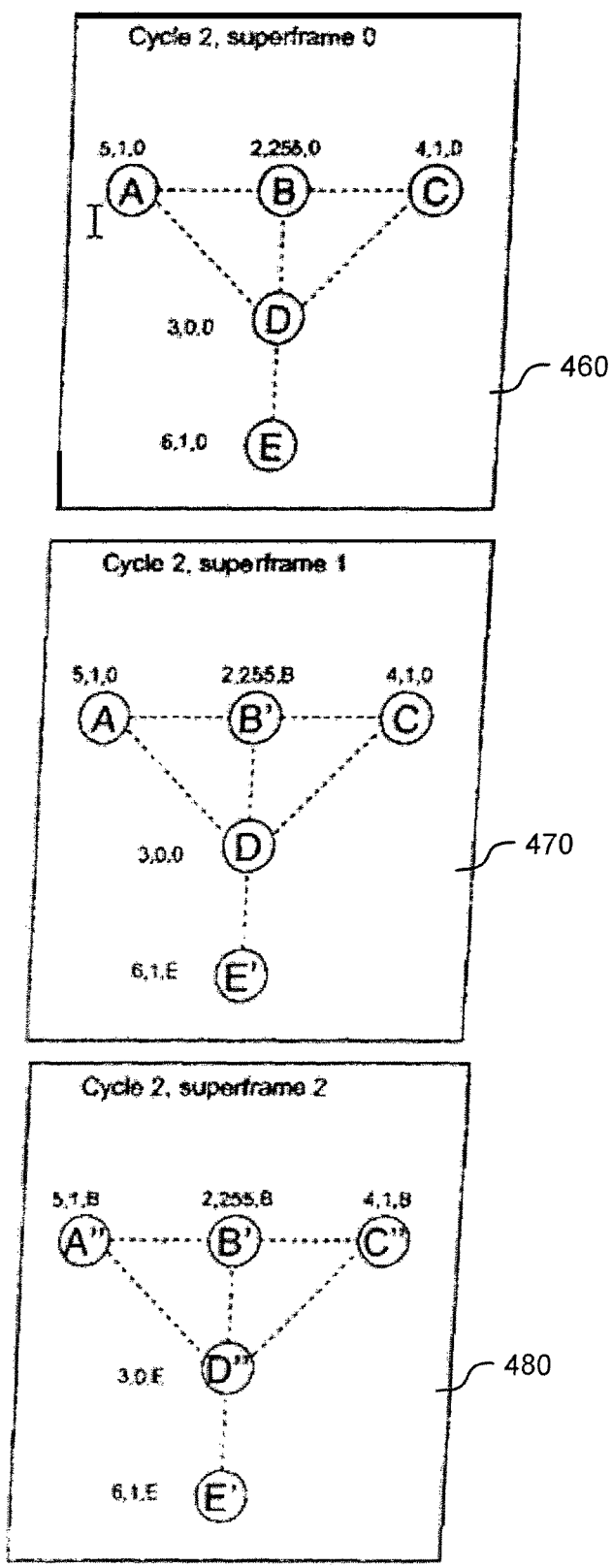

Now, consider another example as shown in FIGS. 4A-C. This time with five devices A, through E, each initialized in block 400, superframe 0 with the same weight, and none of them is currently designated as an anchor.

In block 410, superframe 1, devices A, C and E each announce themselves as an anchor.

In block 420, superframe 2, device B elects C as its anchor and device D elects E as its anchor. In one embodiment, if two or more neighbors of a device announce themselves to be anchors, then the device is free to choose any of the announced anchors. In this case, B chose C from among A and C. Other embodiments my put other rules or restrictions to drive the selection.

FIG. 4B illustrates the starts of cycle 1. In block 430, for superframe 0, each device adjusts its weight. As with the first example, in this example, current weighting is based on past service as an anchor. As such, in this example, the prior anchors, C and E, each adjust their weights to '0' and announce these weights in their respective beacons.

In block 440, superframe 1, B and D are the highest weighted devices because they have yet to serve as anchors in this example. Because D is a nearest neighbor to each of the other devices, it is only necessary to assign an anchorship position to D, therefore D elects itself and B does not.

In block 450, superframe 2, each of the other devices, A, B, C, and E, announces D as their beacon.

FIG. 4C illustrates the start of cycle 2. In block 460, the weightings are adjusted to reflect past assignments as described above in the first example. As this illustrates, B is the highest weighted at 255, as it has yet to be an anchor in this example.

In the next superframe, block 470, based on these weightings, B announces itself as an anchor. Also, E announces itself as an anchor as it has a higher weighting than it's only network neighbor.

As such, in superframe 2, block 480, B and E are designated as anchors by their respective neighbors. In this example, D designated E. This can be done, for example, because E has a higher beacon slot number. In another embodiment, D might also select B based on alternative criteria.

Figure 5A:
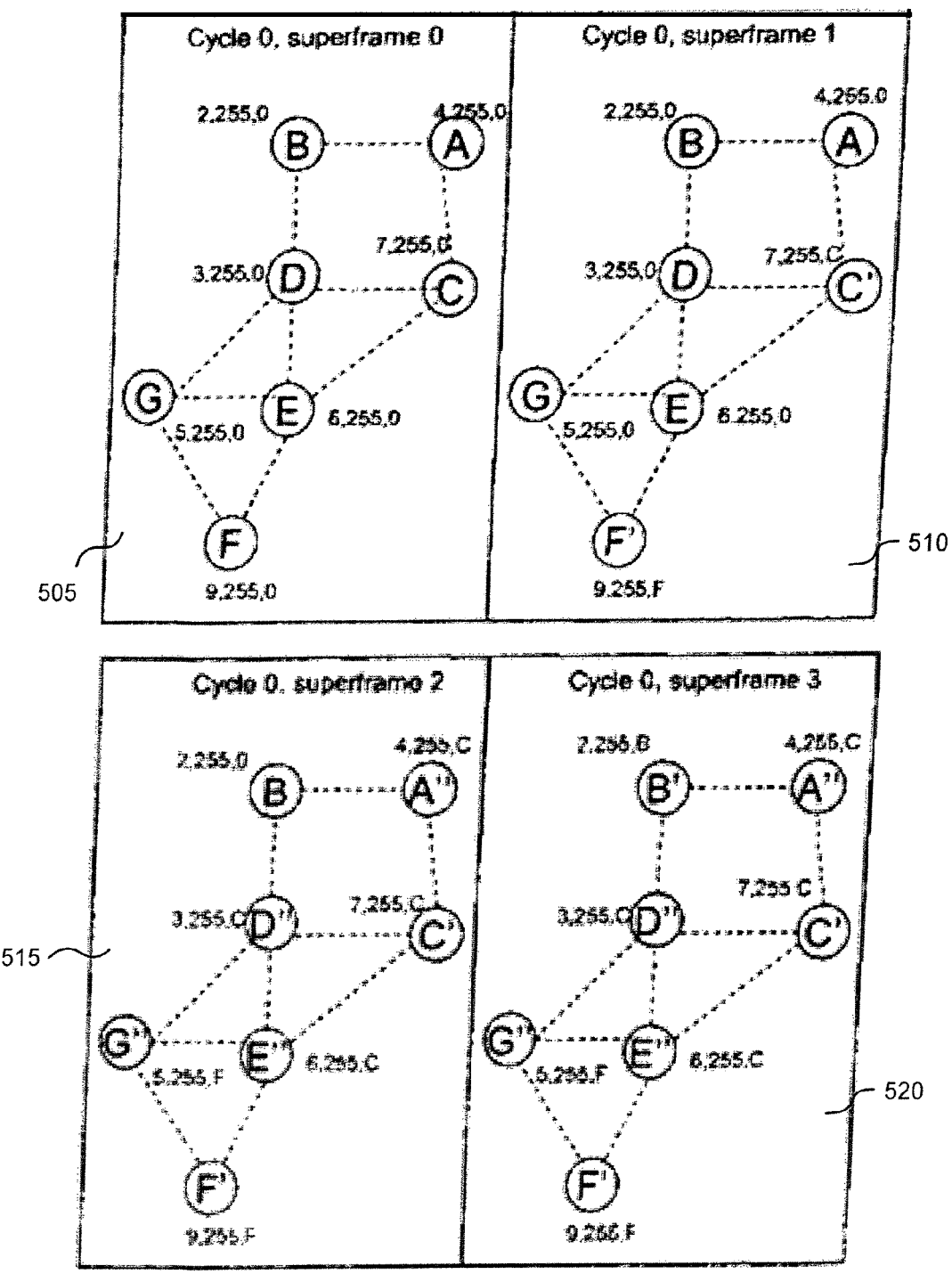
Figure 5B:
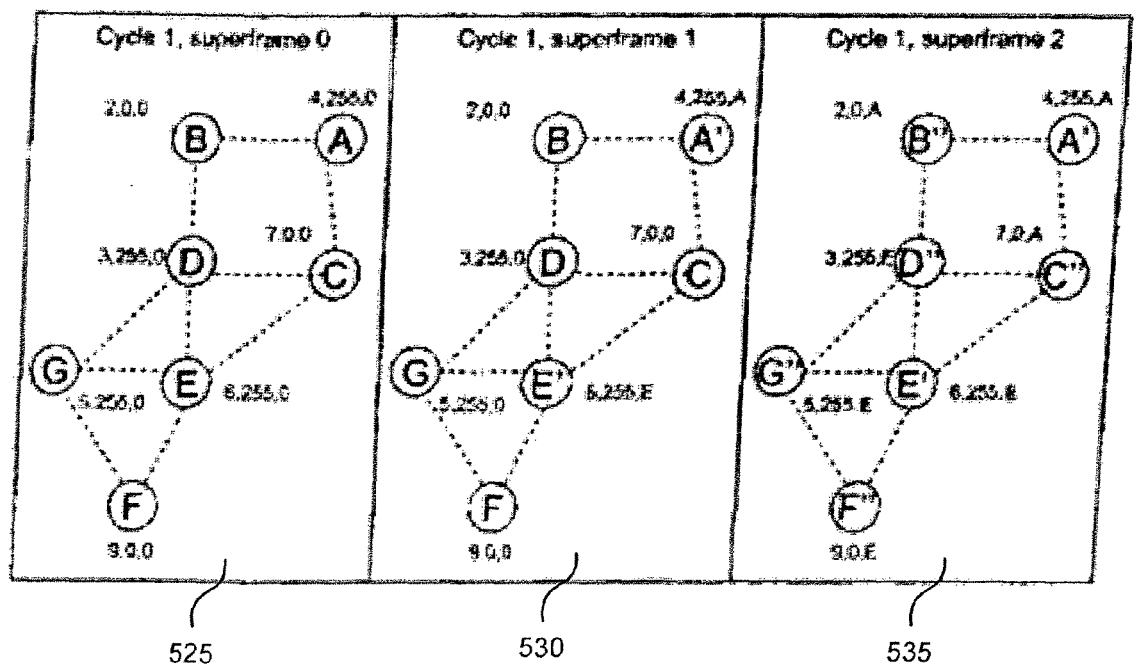
Figure 5C:
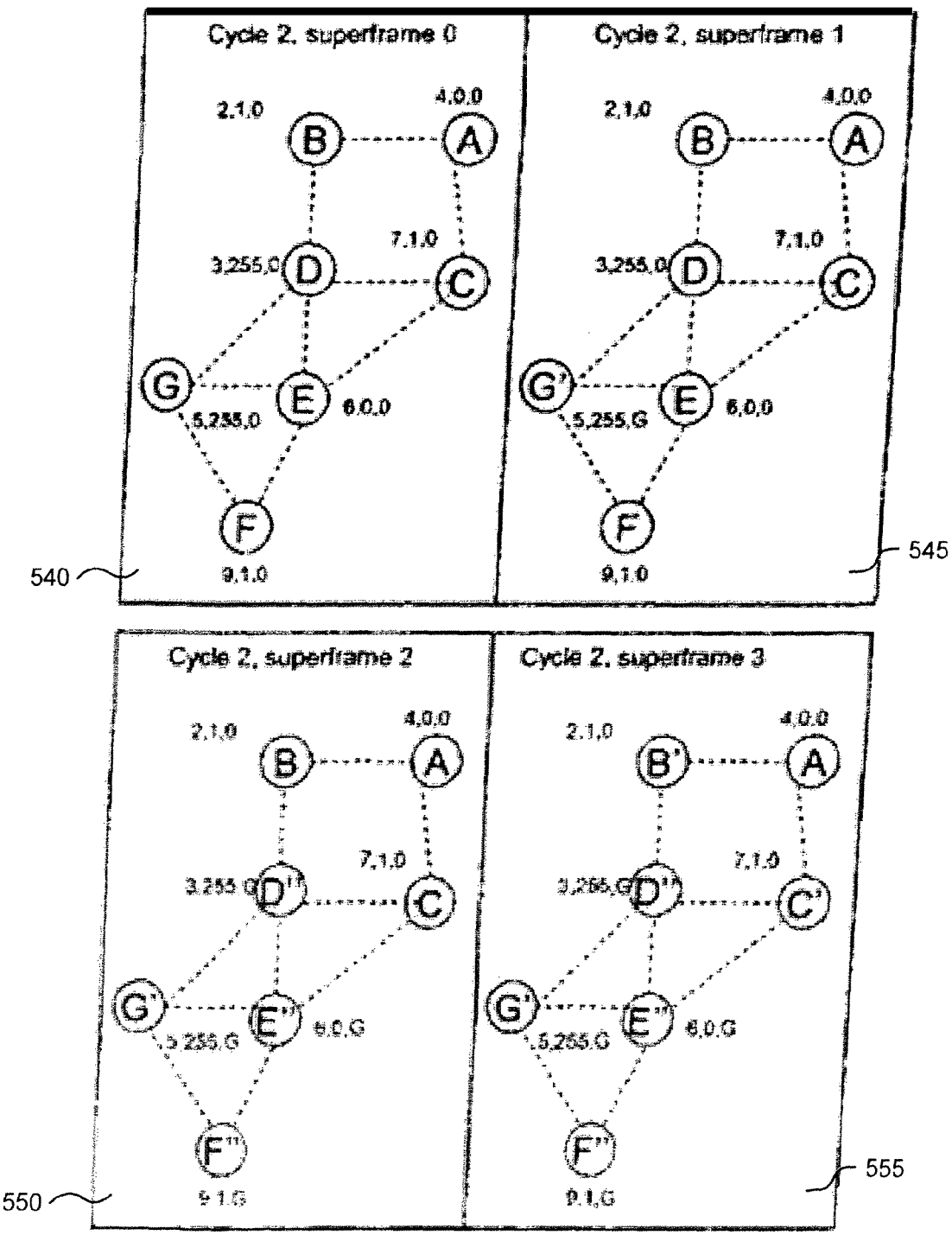

FIGS. 5A-C illustrate a third example. FIG. 5A shows 7 devices, A-G. The cycle starts with block 505 where all devices share their statuses and weighted values. In block 510, superframe 1, devices C and F designate themselves as anchors.

In block 515, superframe 2, devices A and D designate C as their anchors, and G and E designate F as its anchor. However, B remains without an anchor. Therefore, in block 520, superframe 3, B designates itself as an anchor.

FIG. 5B illustrates the start of cycle 1, the weightings are adjusted and announced in superframe 0, block 525.

Now, in block 530, superframe 1, devices A and E designate themselves as anchors. A is higher weighted than B and C. Likewise, E has a higher beacon slot number than its similarly weighted neighbors. Then, in block 535, superframe 2, B and C elect device A as their anchor, while D, F and G elect their announced neighbor, device E.

Then, in cycle 2, as illustrated in FIG. 5C, the weightings are adjusted and announced in superframe 0, block 540. In block 545, superframe 1, based on the shared information, G elects itself as an anchor.

In block 550, superframe, 2, G's neighbors, D, E and F only have one choice, and therefore elect G as their anchor. However, device A, B and C do not have an anchor in radio range to choose. Therefore, in block 555, superframe 3, B and C designate themselves as anchors. Then, although not illustrated, in superframe 4, A announces either B or C and the negotiation is finished.

Figure 6A:
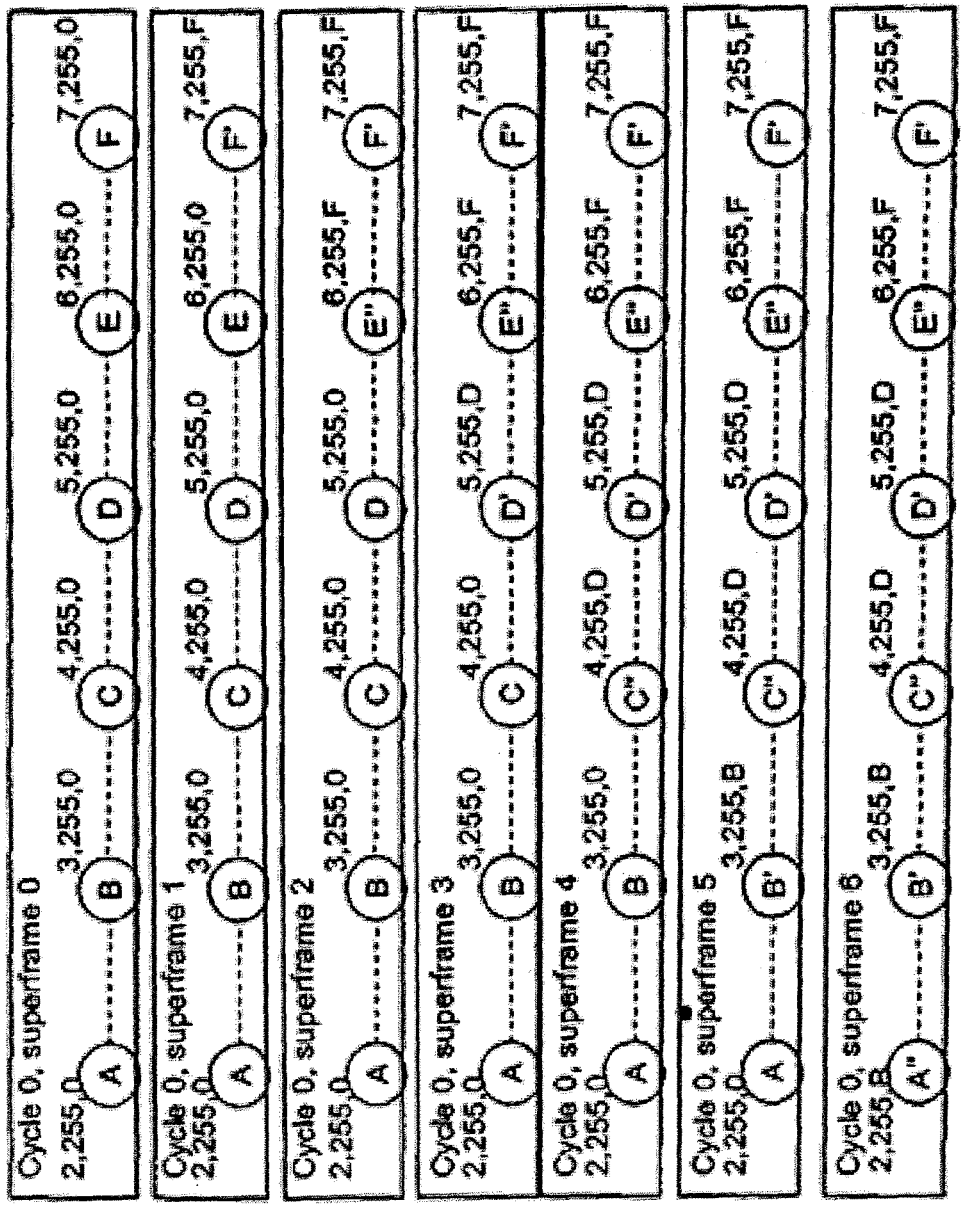
Figure 6B:
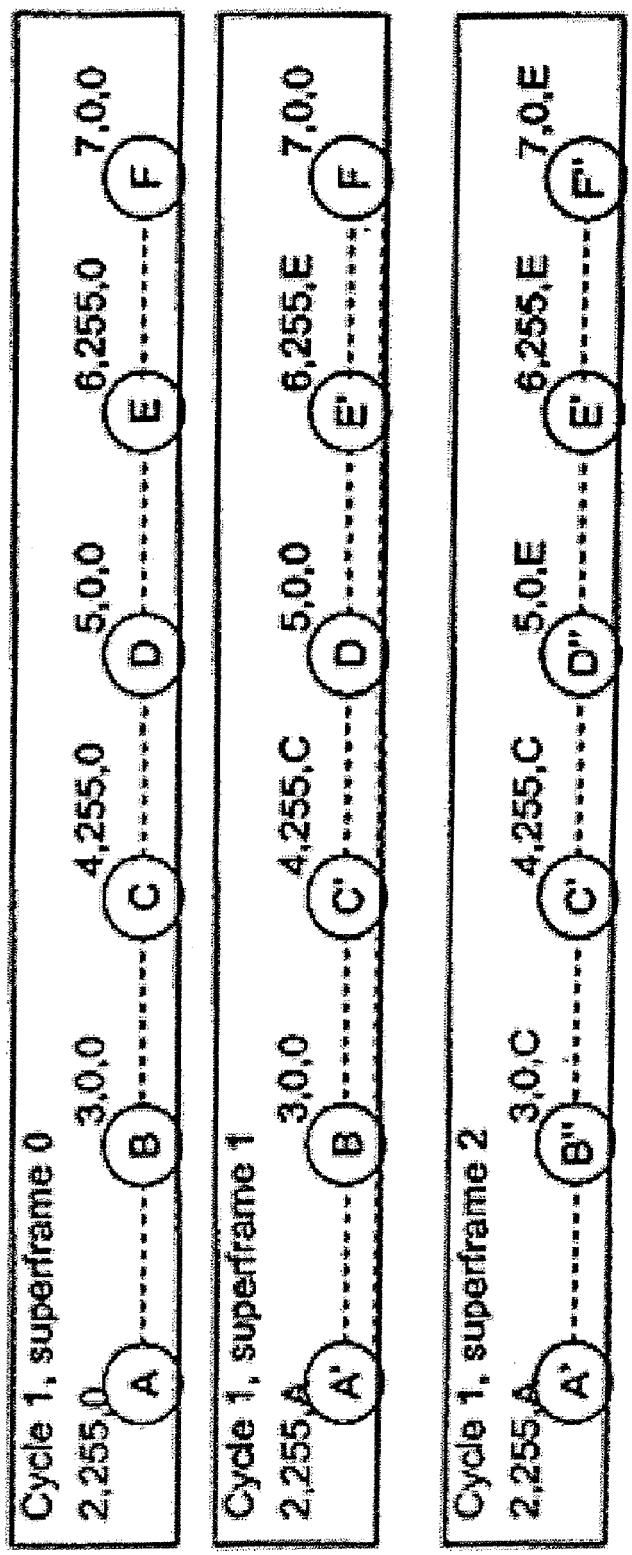
Figure 6C:
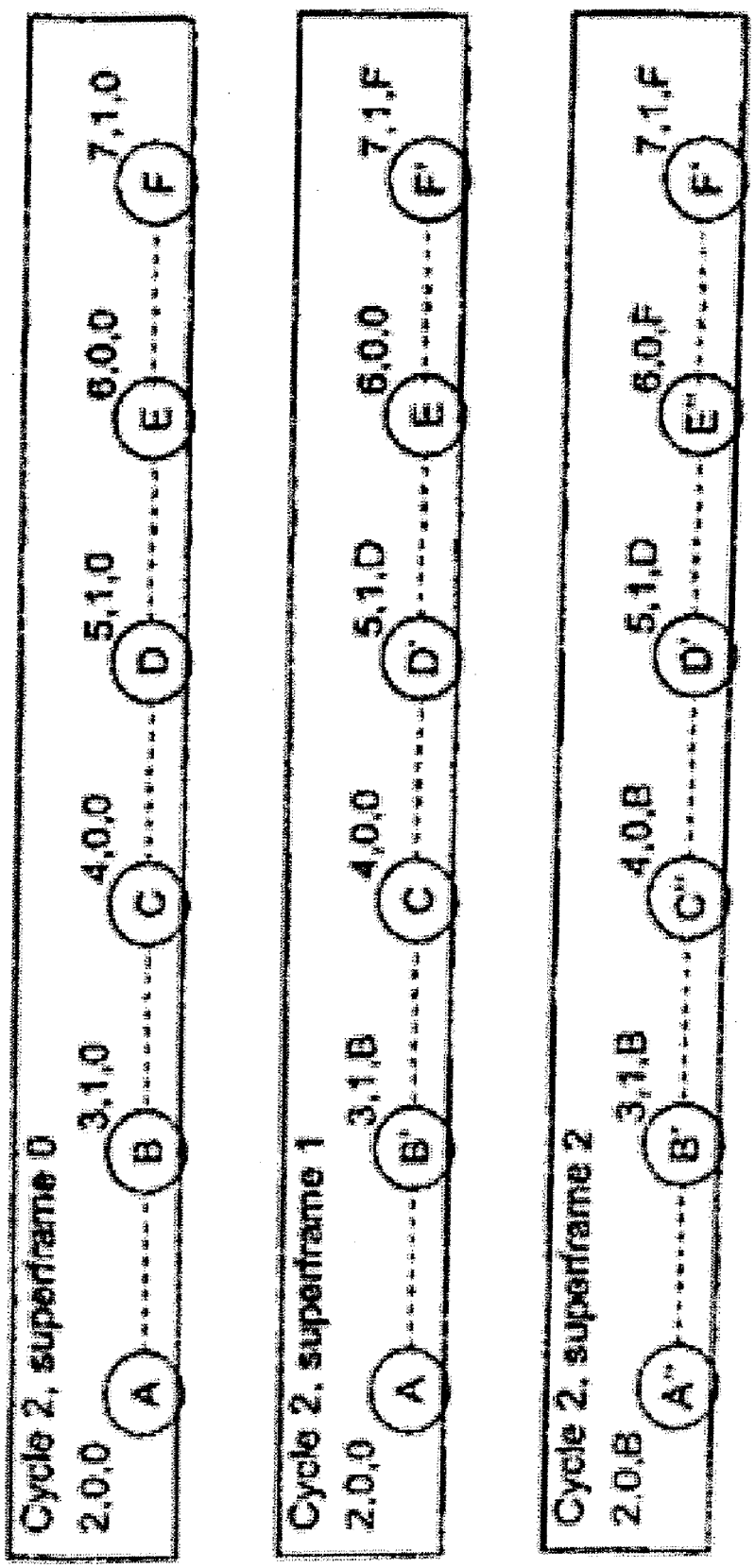

FIGS. 6A-C illustrate a fourth example where there is large separation of devices across the network, and a device may be several steps removed from certain of its neighbors. For example, consider a linear network in which A is only in radio contact with B, B is only in radio contact with A and C, C is only in radio contact with B and D, and so on. Consider such a network having six devices A-F as illustrated in FIGS. 6A-C.

In FIG. 6A, it took seven superframes to negotiate the anchor positions. Therefore, in one embodiment, the negotiation control logic can be implemented, to consider network topology as well.

For an example of a negotiation considering network topology, consider FIG. 6B that shows negotiation among the same network elements.

In FIG. 6B, the initial weighting was distributed across the network in accordance with topology. For example, weighting can be distributed based on network position, number of network neighbors, beacon slot, and so on. Here, with the weighting distributed, and more devices initially volunteering themselves as anchors, the negotiation can be completed in 3 superframes.

Then, in the next cycle, weighting can again reflect prior assignments (as well as other criteria) and the negotiation can be completed as shown in FIG. 6C.

Figure 7:
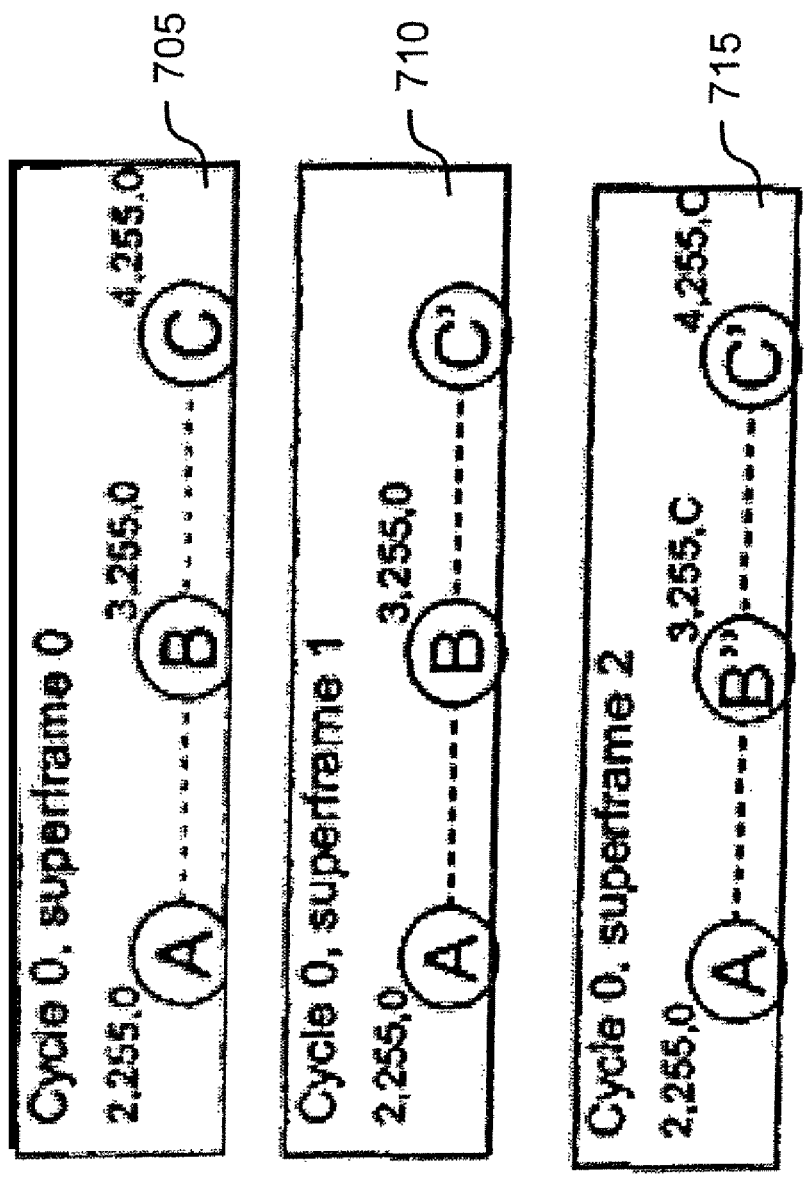

Finally, consider a fifth example, as illustrated in FIG. 7. In this example, each device includes its weight (e.g., IE# 1) in its beacons starting from the first superframe of every cycle until it selects its anchor. After that, the device includes the anchor designation (e.g., in IE#2) in every beacon until the end of the current cycle. In this example, to select itself to be an anchor, a device needs to hear either the weighting or the anchor designations of every neighbor.

In block 705, C's beacon was not received by B, so B is still waiting to receive C's weighting. Then, in block 710, superframe 1, B receives C's self designation, which is enough to enable B to make its own determination, which it announces in superframe 2, block 715.

The control logic or other modules that can be included to implement these mechanisms within the network devices or other electronic devices that can utilize these protocols and schemes may be specially constructed for the outlined purposes. Alternatively, any or all of the functionality described herein can be performed using or integrated with general or special purpose control logic or other modules. For example, modules used to perform other functions in the associated electronic device can be made to include some or all of these features. For example, electronic devices that can take advantage of the features and functionality of the present invention may have control logic configured to manage communications or to manage the other operational functionality of the electronic device. This control logic can also be configured to implement the functionality described herein, or dedicated control logic can be used, or a hybrid thereof. Such control logic can be implemented using hardware, software, or a combination thereof. For example, one or more processors, ASICs, PLAs, and other logic devices or components can be included with the device to implement the desired features and functionality. Additionally, memory or other data and information storage capacity can be included to facilitate operation of the device and communication across the network.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The invention claimed is:

1. A method for managing power of a plurality of devices on a network, comprising:

transmitting a first weighted value and a first anchor status of a first device on the network to a second device on the network, wherein the second device is a neighboring device to the first device;

receiving a second weighted value and a second anchor status from the second device; and assigning an anchor status to one of the devices based on one or more of the weighted values and the anchor statuses, wherein the anchor device is configured to either wake up at predetermined times or to remain active.

2. The method of claim 1, wherein each weighted value comprises a number of cycles a respective device has not been an anchor.

3. The method of claim 2, wherein each weighted value is further based on one or more of a device characteristics such as the device function, type, power characteristics, location in the network, importance ranking, and communication partners.

4. The method of claim 3, further comprising:
assigning either the first or second device as a dedicated anchor device for the network based on the first and second weighted values.

5. The method of claim 1, wherein the anchor is configured to go into a partial hibernation when it is not in active mode.

6. The method of claim 1, wherein assigning an anchor status further comprising:
selecting the first device as the anchor device if only the first anchor status is positive;
selecting the second device as the anchor device for the first device if only the second anchor status is positive;
selecting the first or second device as the anchor device based on the weighted value of each respective device if both the first and second anchor statuses are the same; and
selecting the first or second device as the anchor device based on a beacon slot value of each respective device if both the first and second weighted values are the same.

7. The method of claim 6, wherein a device with a higher beacon slot value is selected as the anchor device.

8. The method of claim 1, wherein the anchor device serves as the anchor for itself and for one or more neighboring devices.

9. The method of claim 1, further comprising:
receiving a third weighted value and a third anchor status from a third device on the network.

10. The method of claim 9, wherein assigning an anchor status further comprising:
a) receiving a weighted value and an anchor status from each neighboring device;
b) selecting one of the devices to be a non-anchor device if all of its neighboring devices have weighted values higher than its own weighted value or if none of its neighboring devices have lower weighted values and all of the neighboring devices with equal weighted values have beacon slot values higher than a beacon slot value of the device;
c) selecting one of the devices as the anchor device if all of its neighboring devices have lower weighted values or if none of its neighboring devices have higher weighted values and all of the neighboring devices with weighted values equal to its own weighted value have beacon slot values lower than a beacon slot value of the device;
d) setting one of the devices as undecided status if none of the devices is selected in steps b and c; and
e) sending a status update of the device to each neighboring device.

11. The method of claim 10, further comprising:
for a non-anchor device, choosing a neighboring device with the undecided status and with a highest weighted value as an anchor device.

12. A system having a plurality of devices connected to a network, the system comprising:
a first device on the network configured to transmit a first weighted value and a first anchor status to a neighboring device; and
a second device on the network configured to transmit a second weighted value and a second anchor status to the first device, wherein the second device is the neighboring device to the first device;
wherein the first and second device are configured to select one of the devices as an anchor device based on one or more of weighted values and the anchor statuses, wherein the anchor device is configured to either wake up at predetermined times or to remain active.

13. The system of claim 12, wherein each weighted value comprises a number of cycles a respective device has not been an anchor.

14. The system of claim 13, wherein each weighted value is further based on one or more of a device characteristics such as the device function, type, power characteristics, location in the network, importance ranking, and communication partners.

15. The system of claim 14, wherein the first or second device is configured to assign either the first or second device as a dedicated anchor device for the network based on one or more of the weighted values.

16. The system of claim 12, wherein the anchor is configured to go into a partial hibernation when it is not in active mode.

17. The system of claim 12, wherein:
the first device is configured to select itself as the anchor device if only the first anchor status is positive,
the second device is configured to select itself as the anchor device if only the second anchor status is positive,
the first or second device is configured to select itself as the anchor device based on the weighted value of each respective device if both the first and second anchor statuses are the same, and
wherein the first or second device is configured to select itself as the anchor device based on a beacon slot value of each respective device if both the first and second weighted values are the same.

18. The system of claim 17, wherein the device with a higher beacon slot value is selected as the anchor device.

19. The system of claim 17, wherein the device with a higher weighted value is selected as the anchor device.

20. The system of claim 19, wherein:
one or more of the devices are configured to select one of the devices to be a non-anchor device if all of its neighboring devices have weighted values higher than its own weighted value or if none of its neighboring devices have lower weighted values and all of the neighboring devices with equal weighted values have beacon slot values higher than a beacon slot value of the device,
one or more of the devices are configured to select one of the devices as the anchor device if all of its neighboring devices have lower weighted values or if none of its neighboring devices have higher weighted values and all of the neighboring devices with weighted values equal to its own weighted value have beacon slot values lower than a beacon slot value of the device, and
wherein one or more of the devices are configured to set one of the devices as undecided status if the device is not set as the non-anchor or anchor device.

21. The system of claim 20, wherein the non-anchor device is configured to choose a neighboring device with the undecided status and with a highest weighted value as the anchor device.

22. The system of claim 17, wherein each device must receive a weighted value or anchor status from all neighboring devices prior to selecting itself as the anchor device.

23. The system of claim 12, wherein the anchor device serves as the anchor for itself and for one or more neighboring devices.

24. The system of claim 12, further comprising:
a third device on the network configured to transmit a third weighted value and a third anchor status to a neighboring device.

* * * * *